United States Patent

Govoni et al.

[11] Patent Number: 5,561,195
[45] Date of Patent: Oct. 1, 1996

[54] HIGHLY PROCESSABLE POLYMERIC COMPOSITIONS BASED ON LLDPE

[75] Inventors: Gabriele Govoni, Renazzo; Massimo Covezzi, Ferrara; Claudio Cometto, Bologna, all of Italy

[73] Assignee: Montell Technology Company bv, Netherlands

[21] Appl. No.: 376,024

[22] Filed: Jan. 20, 1995

[30] Foreign Application Priority Data

Jan. 21, 1994 [IT] Italy .................... MI94A0087

[51] Int. Cl.$^6$ .................. C08L 23/08; C08L 23/16; C08L 23/18
[52] U.S. Cl. .................. 525/240; 525/323; 525/322; 525/320
[58] Field of Search .................. 525/240, 323

[56] References Cited

U.S. PATENT DOCUMENTS

| | | | |
|---|---|---|---|
| 4,161,574 | 7/1979 | Strametz et al. | 526/348.6 |
| 4,218,339 | 8/1980 | Zucchini et al. | |
| 4,339,496 | 7/1982 | Weiner | 525/240 |
| 4,472,520 | 9/1984 | Zucchini et al. | |
| 4,643,945 | 2/1987 | Kiang | 525/240 |
| 4,748,221 | 5/1988 | Collomb et al. | |
| 4,803,251 | 2/1989 | Goode et al. | |
| 4,871,813 | 10/1989 | Senez | 525/240 |
| 5,051,481 | 9/1991 | Taka et al. | 525/240 |
| 5,387,749 | 2/1995 | Govoni et al. | 525/240 |

FOREIGN PATENT DOCUMENTS

| | | |
|---|---|---|
| 0395083 | 10/1990 | European Pat. Off. |
| 0519837 | 12/1992 | European Pat. Off. |
| 0553805 | 8/1993 | European Pat. Off. |
| 0553806 | 8/1993 | European Pat. Off. |
| 0556815 | 8/1993 | European Pat. Off. |
| WO93/03078 | 2/1993 | WIPO |

OTHER PUBLICATIONS

J.T. Trotignon, J.L. Lebrun, J. Verdu, "Plastics and Rubber Processing and Applications", 2, (1982), pp. 247–251.

*Primary Examiner*—Carman J. Seccuro, Jr.
*Attorney, Agent, or Firm*—Bryan Cave LLP

[57] ABSTRACT

Polymeric compositions based on Linear Low Density Polyethylene (LLDPE) comprising: (A) from 75 to 95% by weight of an ethylene copolymer with an α-olefin $CH_2=CHR$, wherein R is an alkyl radical having from 1 to 10 carbon atoms, and (B) from 5 to 25% by weight of a copolymer of propylene with ethylene and an α-olefin $CH_2=CHR'$, wherein R' is an alkyl radical having from 2 to 10 carbon atoms. Copolymer (B) is characterised by a relatively high insolubility in xylene. The polymeric compositions of the invention are endowed with improved processability and improved mechanical properties with respect to the LLDPE of the conventional type.

15 Claims, No Drawings

HIGHLY PROCESSABLE POLYMERIC COMPOSITIONS BASED ON LLDPE

The present invention relates to a polymeric composition based on linear low density polyethylene (LLDPE) endowed with improved processability and improved mechanical properties with respect to the LLDPE of conventional type. The polymeric compositions according to the invention comprise, in addition to the linear low density polyethylene, a copolymer of propylene with ethylene and at least an $\alpha$-olefin $CH_2=CHR^I$, wherein $R^I$ is an alkyl radical having from 2 to 10 carbon atoms, said copolymer of propylene having a relatively high insolubility in xylene.

The LLDPE polyethylene has several applications and it is particularly employed in the preparation of films. This is a consequence of the fact that the LLDPE films are endowed, with respect to those obtained by conventional low density polyethylene (LDPE), with improved mechanical and optical properties.

The production of LLDPE films, however, presents some difficulties, mainly due to the fact that the polymer in the melted state does not have a sufficiently high melt strength, while its viscosity in the melted state is rather high.

In order to keep the productivity of the film extruders unaltered, it is necessary to modify them, for instance by widening the slit or increasing the temperature of the extruder head.

These modifications cause difficulties in the cooling of the blowing bubble at the extruder outlet and dishomogeneity in the film thickness.

In addition to these drawbacks, the hot welding of the LLDPE films shows low resistance to heat.

In order to overcome the above shortcomings, in U.S. Pat. No. 4,871,813, it was proposed to use blends of LLDPE with a crystalline copolymer of propylene with an alpha-olefin $CH_2=CHR^I$ (where $R^I$ is an alkyl radical having 2–10 carbon atoms) optionally containing ethylene in amounts lower than 10%; in any case, the ethylene content must always be lower than the $\alpha$-olefin content.

The propylene copolymer contains from 7 to 40% by weight of $\alpha$-olefin, has a fusion enthalpy lower than 75 J/g and is added in an amount of from 1 to 25% by weight. Moreover, the propylene copolymers disclosed in said patent are characterized by a particularly irregular molecular structure, due to the good randomization of the comonomer and to the low isotactic index. In particular, the isotactic index determined through solubility measures in n-heptane, is always lower than 65. The degree of crystallinity of the propylene copolymer is low, always lower than 35%, preferably from 10 to 30%.

The LLDPE-propylene copolymer blend is prepared by mixing the components in the melted state in an extruder and subsequently pelletising. It is also possible to mix the components in the solid state and to feed such mixture directly into the extruder for the molding of the finished article.

The so obtained compositions show a certain improvement of the processability and of heat resistance during hot welding. On the contrary, the mechanical properties do not substantially change.

The International Patent Application WO 93/03078 describes a process for the preparation of LLDPE having improved processability characteristics by sequential polymerization in two or more gas-phase reactors having a fluidized or mechanically mixed bed. In one of the reactors, mixtures of ethylene and an $\alpha$-olefin $CH_2=CHR$, wherein R is an alkyl radical having from 1 to 10 carbon atoms, are polymerized to give LLDPE and, in another reactor, mixtures of propylene and an $\alpha$-olefin $CH_2=CHR^I$, wherein $R^I$ is an alkyl radical having from 2 to 10 carbon atoms, are polymerized to give a crystalline copolymer of propylene having a fusion enthalpy higher than 70 J/g. The thus obtained compositions have, with respect to the previously described mechanical mixtures, the advantage of a better homogeneity and therefore improved optical properties. The polymer obtained does not necessitate pelletisation processes and can be fed directly into the film extruder with a remarkable energy saving.

It has now been found that it is possible to produce a LLDPE having better processing characteristics and at the same time improved mechanical properties through mixing of LLDPE with a copolymer of propylene with ethylene and at least one $\alpha$-olefin having particular characteristics of insolubility in xylene.

Unexpectedly the impact resistance and tear resistance of the polymeric composition of LLDPE with the crystalline copolymer of propylene with ethylene and at least one $\alpha$-olefin $CH_2=CHR^I$ are much better than the analogous non modified LLDPE. For example, mixing a LLDPE, obtained by copolymerization of ethylene and 1-butene, with a copolymer of propylene with ethylene and 1-butene, the mechanical properties of the so obtained composition are decisively better with respect to the initial LLDPE and are the same as, or better than those of the LLDPE obtained by copolymerization of ethylene with 1-hexene. This constitutes a remarkable advantage in that, as known, the LLDPE copolymers of ethylene with butene have decisively lower production costs than the LLDPE with hexene or other higher $\alpha$-olefins.

The mechanical properties are better than, for the same conditions, those obtained according to the process of the patent application WO 93/03078.

These improvements are further accentuated when the polymeric compositions of the invention are directly prepared in synthesis by a sequential polymerisation process.

The polymeric compositions of the invention comprise: (a) 75 to 95% by weight of a copolymer of ethylene with an $\alpha$-olefin $CH_2=CHR$, where R is an alkyl radical having 1 to 10 carbon atoms, said copolymer of ethylene containing up to 20% by mole of $\alpha$-olefin $CH_2=CHR$, and (b) 5 to 25% by weight of a copolymer of propylene with ethylene and at least one $\alpha$-olefin $CH_2=CHR^I$, where $R^I$ is an alkyl radical having 2 to 10 carbon atoms. The copolymer (b) contains 80 to 98% by weight of propylene, 1 to 10% by weight of ethylene and 1 to 10% by weight of $\alpha$-olefin $CH_2=CHR^I$ and is characterised by an insolubility in xylene of higher than 70%.

It has been seen in fact that, in order to obtain improvements in the mechanical properties and the processability of LLDPE, it is essential that the copolymer (b) has an insolubility in xylene of higher than 70%; that is also when the fusion enthalpy, determined by Differential Scanning Calometry (DSC), shows relatively low values, for example 50 J/g.

The high insolubility in xylene is and index of stereoregular structure of the propylene and of a homogeneous distribution of the ethylene and $\alpha$-olefin $CH_2=CHR^I$ units in the polymeric chain.

The xylene insoluble, determined according to the subsequent method, is preferably higher than 75%, more preferably higher than 85%. Preferably in the copolymer (b) the content of propylene ranges between 85 and 96% by weight, the content of ethylene ranges between 2 and 8% by weight and the content of $\alpha$-olefin $CH_2=CHR^I$ ranges between 2 and 7% by weight. The content of ethylene may also be higher than that of the α-olefin $CH_2=CHR'$. The content of the various components is determined by IR and NMR analysis.

The α-olefin $CH_2=CHR'$ may be selected, for example, among 1butene, 1-hexene, 1-octene, 4-methyl-1-pentene, and preferably is 1-butene or 1-hexene.

The fusion enthalpy of the copolymer (b) is generally higher than 50 J/g, preferably higher than 60 J/g, more preferably higher than 70 J/g. The melting temperature of the copolymer (b) is less than 140 °C. and preferably between 120 and 140° C.

The crystallinity index of the copolymer (b) is generally higher than 50%.

The Melt Index (determined according to the method ASTM D-1238, condition L) of the copolymer (b) has values generally ranging between 5 and 1000, preferably between 5 and 100, more preferably between 5 and 30.

The copolymers which constitute the component (b) of the polymeric composition of the invention may be conveniently prepared using a highly stereospecific catalyst, of the type described in the patent application EP-A-395083, the description of which is included for reference.

The copolymer (a) used in the composition of the invention has a density comprised between 0.88 and 0.945 $g/cm^3$. Preferably these values are comprised between 0.89 and 0.94, more preferably between 0.90 and 0.935.

The Melt Index (determined by the method ASTM D-1238, condition E) of the copolymer (a) has values generally comprised between 0.1 and 10 g/10 minutes, preferably comprised between 0.2 and 3 g/10 minutes, more preferably between 0.2 and 1 g/10 minutes.

The α-olefin $CH_2=CHR$ may be, for example, selected among propylene, 1-butene, 1-hexene, 1-octene, 4-methyl-1-pentene; preferably 1-butene or 1-hexene is used. In the preparation of component (a) of the composition of the invention, the olefins $CH_2=CHR$ may even be used as a mixture.

The copolymer (a) is prepared by copolymerization of ethylene with an α-olefin $CH_2=CHR$, in the presence of a Ziegler-Natta type catalyst obtained by the reaction of an organometallic compound of a metal from groups II and III of the Periodic Table with a catalytic component comprising a transition metal belonging to groups IV, V or VI of the Periodic Table. Preferably the transition metal compound is supported on a solid carrier comprising magnesium halide in active form. Examples of catalysts usable in the preparation of the copolymer (a) are described in U.S. Pat. No. 4,218,339 and U.S. Pat. No. 4,472,520 the description of which is herein included for reference. The catalysts may also be prepared according to the methods described in the US patents U.S. Pat. No. 4,748,221 and 4,803,251.

Particularly preferred are the catalysts comprising components having regular morphology, for example spherical or spheriform. Examples of such catalysts are described in the patent applications EP-A-395083, EP-A-553805 and EP-A-553806.

The polymeric compositions of the invention preferably comprise from about 75 to about 95% by weight of copolymer (a) and from about 5 to about 25% by weight of copolymer (b); preferably, the content of copolymer (a) is comprised between 75 and 90% by weight and the content of copolymer (b) between 10% and 25% by weight.

Preferably component (a) is a copolymer of ethylene with 1-butene and component (b) is a copolymer of propylene with ethylene and 1-butene.

In the X-ray diffraction spectra of the composition of the invention both reflections typical to polyethylene and polypropylene appear.

The polymeric compositions of the invention may be prepared by mixing the components in the melted state, for example in a single or twin screw extruder. The components of the mixture may be fed directly into the extruder or may be premixed in the solid state.

Preferably the composition of the invention is directly prepared in polymerisation operating in at least two reactors in series in which, whatever the order and using the same catalyst in the various reactors, in one of the reactors copolymer (a) is synthesised and in the other reactor copolymer (b) is synthesised. The polymerization is conveniently carried out in the gas phase using a fluidised bed reactor.

A further aspect of the present invention in fact relates to a process to prepare the previously described composition directly by polymerization of the monomers in the gas phase, in the presence of a catalyst obtained from the reaction between:

(i) a solid catalytic component comprising a titanium compound containing at least a titanium-halogen bond supported on a magnesium halide in active form and optionally an electron-donor compound;

(ii) an Al-alkyl compound;

(iii) optionally, an electron-donor compound; operating in two or more fluidised or mechanically stirred bed reactors in series in which, in any order and using the same catalyst in the various reactors:

(I) in one reactor a mixture of ethylene with an α-olefin $CH_2=CHR$, where R is an alkyl radical having 1 to 10 carbon atoms, is polymerised to obtain a copolymer of ethylene with said olefin containing up to 20% by mole of α-olefin;

(II) in another reactor a mixture of propylene, ethylene and at least one α-olefin $CH_2=CHR'$, where $R'$ is an alkyl radical having 2 to 10 carbon atoms, is polymerised to obtain a copolymer with a xylene insoluble fraction higher than 70% and containing 80 to 98% by weight of propylene, 1 to 10% by weight of ethylene and 1 to 10% by weight of α-olefin $CH_2=CHR'$, in amounts of between 5 and 25% by weight with respect to the total polymer obtained in (I) and (II).

Preferably the gas phase polymerisation is preceded by the following stages:

(a) pre-contact of the catalyst components in the absence of polymerizable olefin or optionally in the presence of said olefin in a quantity less than 5 grams per gram of solid catalytic component, operating in such a way to obtain a stereospecific catalyst capable of yielding, during the polymerization of step (II) previously described, a copolymer of propylene with ethylene and at least one α-olefin $CH_2=CHR'$, having an insolubility in xylene of at least 70%;

(b) pre-polymerization, using the catalyst obtained in step (a), of propylene or mixtures thereof with ethylene and/or alpha-olefins $CH_2=CHR'$, under conditions such to obtain a polymer having an insolubility in xylene of higher than 60%, in an amount of from 5 to about 1000 g per g of solid catalyst component, preferably comprised between 10 and 500 g per g of solid catalyst component.

The polymeric compositions of the invention are characterised by improved mechanical properties when compared with the mechanical properties of the corresponding non-modified LLDPE. In particular the impact resistance, measured by the method ASTM D1709 (Dart test) and the tear resistance, measured by the method ASTM D1922 (Elmendorf method) are improved. The film obtained from the composition prepared by mechanical mixing of the components has impact resistance (Dart test) generally higher than 4 g/micron, whilst films obtained from the compositions directly prepared in synthesis have values even higher than 8 g/micron. The tear resistance, determined by the Elmendorf method on the films obtained from the composition of the invention having a thickness of 25 micron, shows values generally higher than 250 grams in the direction of the machine and higher than 500 grams in the transversal direction. These values are particularly important in that they are associated with a good processability which allows the performance of the film extruder to be improved without worsening the optical and mechanical properties of the film itself. With respect to the conventional type LLDPE it is possible to obtain a film having better mechanical properties at a lower cost.

Because of their high processability and mechanical strength characteristics, the compositions of the invention find applications in several sectors such as: blown films and cast films both monolayer and multilayer; coextruded films and laminates in which at least one layer consists of the composition of the invention, and at least one layer consists of a thermoplastic polymer, such as for example polypropylene homopolymer, copolymers of propylene with ethylene and/or α-olefin having 4–12 carbon atoms, polyethylene homopolymer (both LDPE and HDPE), copolymers of ethylene with α-olefin having 3–12 carbon atoms, ethylene-vinylacetate copolymers, polyvinylidene chloride; extrusion jackets for substrates and electric cables; injection molding; blow molding; thermoforming.

The following examples are given to illustrate and not to limit the invention.

EXAMPLE

The properties indicated have been determined according to the following methods:

Poller composition: percentage by weight of the various monomers determined by I. R.;

Xylene insolubles: 2 g of polymer is dissolved in 250 cm$^3$ of xylene at 135° C. whilst stirring. After 20 minutes the solution is left to cool under stirring until the temperature reaches 25 ° C. After 30 minutes the insoluble polymer precipitate is separated by filtration. The solvent is removed from the solution via evaporation under a nitrogen flow and the residue is dried under vacuum at 80° C. until a constant weight is reached. In this way the percentage of soluble polymer in xylene at 25° C. is calculated and, consequently, the percentage of insoluble polymer is determined;

Melting temperature: ASTM D 3418–82;

Enthalpy of fusion: ASTM D 3418–82;

Density: ASTM D 1505;

Melt Index E (MIE): ASTM D 1238, condition E;

Melt Index F (MIF): ASTM D 1238, condition F;

Melt Index L (MIL): ASTM D 1238, condition L;

F/E: ratio between Melt Index E and Melt Index F;

Haze: ASTM D 1003;

Dart test: ASTM D 1709;

Elmendorf Tear Strength: ASTM D 1922, determined both in machine direction (MD) and transversal direction (TD);

Crystallinity index: determined on a granule by X-ray diffraction analysis. The level of crystallinity is quantified according to the method described by J. T. Tritignon, J. L. Lebrun, J. Verdu, Plastics and Rubber Processing and Applications, 2, (1982), pag 247–251. According to said methodology three variable parameters are defined from 0 to 1. The first of which (CR) is the total crystallinity index, the second (PP) is the polypropylene type crystallinity index, the third (PE) is a polyethylene type crystallinity index.

EXAMPLE 1

A polymeric composition according to the invention was prepared by mechanical mixing of a component (a) (LLDPE obtained by copolymerizing ethylene with 1-butene) with a component (b) (copolymer of propylene with ethylene and 1-butene). The characteristics of the components used were:

| (a) LLDPE: | | |
|---|---|---|
| MIE | 0.8 | g/10 min |
| F/E | 28.3 | |
| Density | 0.9217 | g/cm$^3$ |
| content of 1-butene | 6 | % weight |
| Dart test | 4.1 | g/micron |
| (b) Copolymer propylene/ethylene/1-butene: | | |
| content of propylene | 92.5 | % weight |
| content of 1-butene | 5 | % weight |
| content of ethylene | 2.5 | % weight |
| MIL | 8 | g/10 min |
| xylene insolubles | 88 | % |
| melting point | 133.1 | °C. |
| enthalpy of fusion | 73.5 | J/g |

The composition was prepared by mixing in an extruder of the Bandera TR 60 type. The blend thus obtained was subsequently filmed through a Betol 2525 extruder. The characteristics of the blend and properties of the film were as follows:

| | |
|---|---|
| content di LLDPE (% weight) | 90 |
| content of copolymer (% weight) | 10 |
| Haze (%) | 29 |
| Dart test (g/micron) | 4.5 |

Notable improvements also resulted in the processability with respect to the initial LLDPE. For the same amount of film produced, the absorption of the film extrusion motor was 8.5 Ampere for non-modified LLDPE and 7.5 Ampere for the blend of LLDPE with the copolymer.

EXAMPLE 2

By comparison, the same LLDPE used in example 1 was mixed in the same extruder previously used with a random copolymer of propylene with 1-butane. The random copolymer of propylene contained 9.5 % by weight of 1-butane, had a melting point of 143 ° C. and a fusion enthalpy of 76 J/g. The blend obtained was filmed using the same apparatus of example 1. The characteristic of the blend and properties of the film were as follows:

| | |
|---|---|
| content of LLDPE (% weight) | 90 |
| content of copolymer (% weight) | 10 |
| Haze (%) | 30 |
| Dart test (g/micron) | 2.4 |

EXAMPLE 3

A composition according to the invention was prepared in a pilot plant operating continuously. The plant comprised a vessel to which the catalytic components were fed and mixed to form the catalyst itself, a loop reactor (prepolymeriser) which received the catalyst formed in the previous step and to which propylene and liquid propane was fed, and two fluidised bed gas phase reactors connected in series, the first of which received the prepolymer formed in the previous stage and discharged the polymer into the second reactor after separation of the non-reacted monomers. In the first reactor the copolymer of propylene with ethylene and 1-butane (component (b)) was produced, in the second reactor a copolymer of ethylene with 1-butene (LLDPE, component (a)) was produced.

The solid catalytic component was prepared according to the method described in example 3 of the patent application EP-A-395083 and was fed into the precontacting vessel. To this vessel triethylaluminium (TEAL) and cyclohexyl-methyl-dimethoxysilane as electron donor were fed in amounts such to give a weight ratio between TEAL and the solid component of 4.95 and a weight ratio between TEAL and the electron donor compound of 5. The precontact vessel was also fed with propane as inert media. The residence time was about 10.5 minutes. The product discharged from this reactor was fed to the prepolymeriser. The residence time in the prepolymeriser was about 30 minutes and the temperature was maintained at 22° C. The prepolymer was then sent to the first gas phase reactor. From this reactor the polymer produced was discharged to a gas-solid separation system which removed the undesirable monomers and then was sent to the second gas phase reactor. The main operating conditions of the gas phase reactor were the following:

| FIRST GAS PHASE REACTOR | | | |
|---|---|---|---|
| Temperature | (°C.) | = | 65 |
| Pressure | (bar) | = | 15 |
| Residence time | (min) | = | 73 |
| Propylene | (% mol) | = | 24.1 |
| Ethylene | (% mol) | = | 0.5 |
| 1-Butene | (% mol) | = | 1.0 |
| Propane | (% mol) | = | 74.2 |
| Hydrogen | (% mol) | = | 0.15 |

The amount of copolymer of propylene with ethylene and butene produced in the first reactor was equal to 15% by weight of the total polymer produced. The characteristics of the propylene copolymer produced in the first reactor were as follows:

| content of propylene | 92.4 | % weight |
|---|---|---|
| content of 1-butene | 5.4 | % weight |
| content of ethylene | 2.2 | % weight |
| MIL | 10 | g/10 min |
| xylene insolubles | 90.5 | % |
| melting point | 132.3 | °C. |
| enthalpy of fusion | 75.5 | J/g |

| SECOND GAS PHASE REACTOR | | | |
|---|---|---|---|
| Temperature | (°C.) | = | 85 |
| Pressure | (bar) | = | 20 |
| Residence time | (min) | = | 120 |
| Ethylene | (% mol) | = | 37.3 |
| 1-Butene | (% mol) | = | 10.8 |
| Propane | (% mol) | = | 38.2 |
| Hydrogen | (% mol) | = | 13.7 |
| Amount of LLDPE produced | | = | 85% by weight of the total produced in the two reactors. |

The final product obtained was filmed using the same apparatus as in example 1. The characteristics of the blend and properties of the film were as follows:

| MIE | | 1.1 | g/10 min |
|---|---|---|---|
| F/E | | 31.0 | |
| Density | | 0.9090 | g/cm³ |
| xylene insolubles | | 83 | % weight |
| melting point | | 123.7 | °C. |
| Dart test | | 8.0 | g/micron |
| Haze | | 37 | % |
| Elmendorf test | MD | 300 | grams |
| | TD | 600 | grams |

EXAMPLE 4

By comparison, in the same pilot plant of example 3, a polymeric composition was prepared according to what described in the patent application WO 93/03078, by copolymerization of propylene with 1-butene in the first gas phase reactor and copolymerization of ethylene with 1-butene in the second gas phase reactor.

The amount of polymer of propylene with 1-butene produced in the first reactor was equal to 15% by weight of the total polymer produced. The characteristics of the propylene copolymer produced in the first reactor were as follows:

| content of propylene | 89.2 | % weight |
|---|---|---|
| content di 1-butene | 10.8 | % weight |
| MIL | 10.7 | g/10 min |
| xylene insolubles | 90.3 | % |
| melting point | 136.2 | °C. |
| enthalpy of fusion | 75.0 | J/g |

The final product obtained was filmed using the same apparatus as in example 1. The characteristics of the blend and properties of the film were as follows:

| MIE | 0.99 | g/10 min |
|---|---|---|
| F/E | 31.1 | |
| Density | 0.9151 | g/cm³ |
| xylene insolubles | 89 | % weight |
| melting point | 122.9 | °C. |
| Dart test | 5.0 | g/micron |
| Haze | 49 | % |

We claim:

1. Polymeric compositions comprising: (a) 75 to 95% by weight of a copolymer of ethylene with an α-olefin $CH_2=CHR$, where R is and alkyl radical having 1 to 10 carbon atoms, said copolymer of ethylene containing up to 20% by mole of α-olefin $CH_2=CHR$, and (b) from 5 to 25% by weight of a copolymer of propylene with ethylene and at least one α-olefin $CH_2=CHR'$ where $R'$ is an alkyl radical having 2 to 10 carbon atoms, containing 80 to 98% by weight of propylene, 1 to 10% by weight of ethylene and 1 to 10% by weight of α-olefin $CH_2=CHR'$, said copolymer (b) being characterised by a xylene insolubles of higher than 70%.

2. Polymeric compositions according to claim 1, wherein the copolymer (b) shows a xylene insolubles of higher than 75%.

3. Polymeric compositions according to claim 1, wherein the copolymer (a) is present in amounts ranging between 80 and 90% by weight and copolymer (b) is present in amounts ranging between 10 and 20% by weight.

4. Polymeric compositions according to claim 2, wherein in the copolymer (b) the content of propylene ranges between 88 and 96% by weight, the content of ethylene ranges between 2 and 8% by weight and the content of α-olefin $CH_2=CHR'$ ranges between 2 and 7% by weight.

5. Polymeric compositions according to claim 1, wherein the copolymer (b) shows a DSC curve with a maximum at temperatures of less than 140° C.

6. Polymeric compositions according to claim 4, wherein the copolymer (b) shows a melting point comprised between 120° and 140° C.

7. Polymeric compositions according to claim 1, wherein the α-olefin $CH_2=CHR$ is propylene, 1-butene, 1-hexene, 1-octene, 4-methyl-1-pentene.

8. Polymeric compositions according to claim 1, wherein the α-olefin $CH_2=CHR'$ is 1-butene, 1-hexene, 1-octene, 4-methyl-1-pentene.

9. Polymeric compositions according to claim 1, wherein the component (a) is a copolymer of ethylene with 1-butene and the component (b) is a copolymer of propylene with ethylene and 1-butene.

10. Polymeric compositions according to claim 1 characterised by a tear strength, measured on a film having a thickness of 25 micron, according to the ASTM D 1922 method of higher than 250 grams in the machine direction and higher than 500 grams in the transversal direction.

11. Polymeric compositions according to claim 1 characterised by an impact resistance, measured according to the ASTM D 1709 method, of higher than 8 grams/micron.

12. Polymeric compositions according to claim 1 in the form of non-extruded granular particles.

13. Polymeric compositions according to claim 1 in the form of spheroidal particles.

14. Films obtained from the polymeric compositions according to claim 1.

15. Formed articles obtained from the polymeric composition of claim 1.

\* \* \* \* \*